(12) United States Patent
Toccaceli

(10) Patent No.: US 7,751,213 B2
(45) Date of Patent: Jul. 6, 2010

(54) SELF-DRIVEN SYNCHRONOUS RECTIFIER

(75) Inventor: Jeffrey Lee Toccaceli, Geneseo, NY (US)

(73) Assignee: Harris Corporation, Melbourne, FL (US)

( * ) Notice: Subject to any disclaimer, the term of this patent is extended or adjusted under 35 U.S.C. 154(b) by 231 days.

(21) Appl. No.: 12/123,909

(22) Filed: May 20, 2008

(65) Prior Publication Data

US 2009/0290391 A1    Nov. 26, 2009

(51) Int. Cl.
*H02M 7/217* (2006.01)
*H02M 3/335* (2006.01)

(52) U.S. Cl. .................. 363/127; 363/21.06; 363/21.14

(58) Field of Classification Search ............. 363/18, 363/19, 21.06, 21.14, 89, 125, 127
See application file for complete search history.

(56) References Cited

U.S. PATENT DOCUMENTS

| | | | | |
|---|---|---|---|---|
| 5,590,032 A * | 12/1996 | Bowman et al. | ............ | 363/127 |
| 6,563,719 B1 * | 5/2003 | Hua et al. | ............ | 363/127 |
| 6,674,658 B2 * | 1/2004 | Mao et al. | ............ | 363/127 |
| 7,499,294 B2 * | 3/2009 | Lin et al. | ............ | 363/21.06 |

* cited by examiner

*Primary Examiner*—Jessica Han
(74) *Attorney, Agent, or Firm*—Fox Rothschild, LLP; Robert J. Sacco

(57) ABSTRACT

A self-driven synchronous DC-DC converter (100) includes an input circuit (101) having a switching device (110) for selectively generating a pulsed DC input voltage responsive to an input switch control signal, the pulsed DC input voltage being one of a plurality of DC voltage pulses; an output circuit (113) coupled to the input circuit (101) and including an active device (114) having device input, device output, and device control nodes, the device control node responsive to a control voltage for selectively varying the conductivity between the device input node and the device output node; and a control circuit (115) coupled to the device control node and configured for generating the control voltage responsive to the pulsed DC input voltage. In the converter (100), the control voltage is synchronized with the pulsed DC input voltage and varies non-linearly during an interval between the DC voltage pulses for selectively reducing the conductivity in accordance with a non-linear function.

20 Claims, 3 Drawing Sheets

SELF-DRIVEN SYNCHRONOUS RECTIFIER

BACKGROUND OF THE INVENTION

1. Statement of the Technical Field

The inventive arrangements are directed to the field of power converters, and more particularly, to power converters including self-driven synchronous rectifiers.

2. Description of the Related Art

Although many types of DC-DC converters have been traditionally implemented using diode-based designs, many conventional DC-DC converters use metal-oxide-semiconductor field effect transistor (MOSFET) based rectifier circuits. MOSFET-based rectifier circuits improve the efficiency of DC-DC converters by reducing the power dissipated in the output rectification stage by reducing the output voltage drop in the rectification stage.

Typically, DC-DC converters can be operated in one of two modes, continuous and discontinuous. Discontinuous mode converters are typically used in low power applications. In general, discontinuous mode converters require that the current in the transforming element on the secondary side fall to zero prior to the end of a switching cycle. This operation is typically accomplished by utilizing switching elements to open or close the circuits in the input and output sides of the power converter. For example, in the case of a synchronized MOSFET rectifier coupled to the secondary winding of a transformer, the signal to the gate of the MOSFET rectifier can be switched on or off, depending on whether the primary or the secondary winding of the transformer should be currently conducting current.

Typically, synchronized MOSFET rectifiers in DC-DC converters are controlled using self-driven and control driven techniques. However, such techniques typically fail to prevent current spikes, or cross-conduction, as the current switches from one side of the DC-DC converter to the other. For example, some self-driven synchronous rectifier designs connect the gate of the MOSFET rectifier directly to the secondary winding of the transformer, resulting in low MOSFET driving losses. However, because the driving voltage and timing for the synchronous MOSFET rectifier is highly dependent on the converter topology, the useable input voltage range is limited because the gate drive voltage varies with input voltage. Control-driven techniques, though more complex than self-driven methods, can overcome some of these limitations, except for preventing cross conduction. Furthermore, control-driven techniques typically require an additional circuit, external to the rectifier circuit, such as a control integrated circuit. Therefore, control-driven techniques can offer constant gate drive voltage but have driving losses and additional cost because of added parts.

SUMMARY OF THE INVENTION

The invention concerns systems and methods for converting DC voltages using self-driven synchronous rectifier circuits. In a first embodiment of the present invention, a self-driven synchronous DC-DC converter circuit is provided. The converter circuit includes an input circuit comprising a switching device configured for selectively generating a pulsed DC input voltage responsive to an input switch control signal, the pulsed DC input voltage comprising a plurality of DC voltage pulses; an output circuit coupled to the input circuit, the output circuit comprising an active device having a device input node, a device output node, and a device control node, the device control node responsive to a control voltage for selectively varying a conductivity between the device input node and the device output node; and a control circuit coupled to the device control node and configured for generating the control voltage responsive to the pulsed DC input voltage. In the converter circuit, the control voltage is synchronized with the pulsed DC input voltage, and varies non-linearly during an interval between the DC voltage pulses for selectively reducing the conductivity in accordance with a non-linear function following each of the voltage pulses.

In a second embodiment of the present invention, a method for converting a first DC voltage to a second DC voltage is provided. The method includes generating a pulsed DC input voltage responsive to an input switch control signal, the pulsed DC input voltage comprising a plurality of DC voltage pulses; generating a control voltage at a device control node of an active device responsive to the pulsed DC input voltage; selectively varying a conductivity between a device input node and a device output node of the active device in response to the control voltage, synchronizing the control voltage with the pulsed DC input voltage, and varying the control voltage non-linearly during an interval between the DC voltage pulses for selectively reducing the conductivity in accordance with a non-linear function following each of the voltage pulses.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
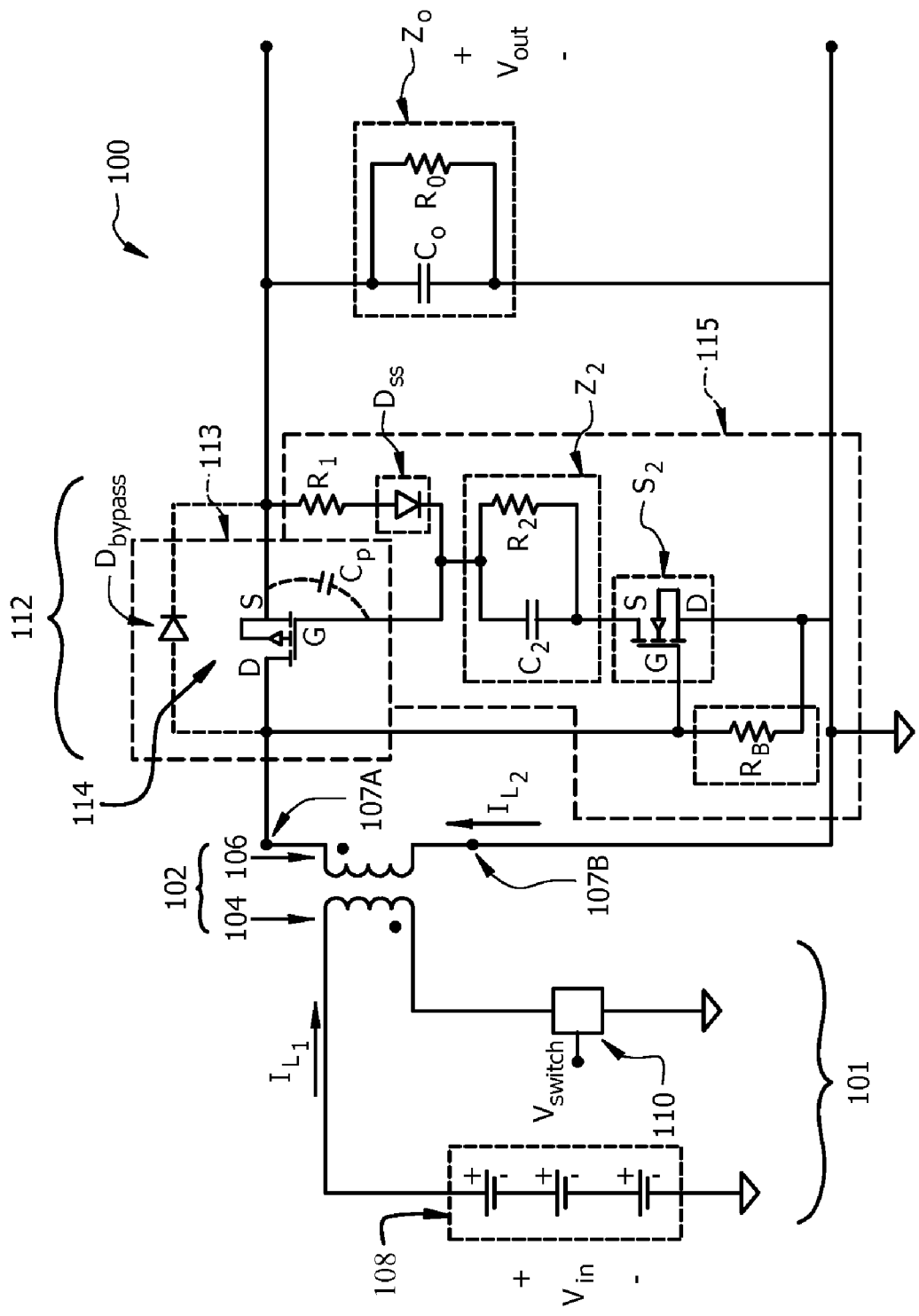
FIG. 1 is a circuit diagram of an exemplary flyback power converter having a self-driven synchronous rectifier according to the various embodiments of the present invention.

A circuit diagram of an exemplary power converter 100 is provided in FIG. 1, which includes a self-driven synchronous rectifier in accordance with the various embodiments of the present invention. As illustrated in FIG. 1, the power converter 100 is shown in a flyback power converter configuration and can include an input circuit 101 and an output circuit 113. The power converter 100 can include a transformer element 102 having a primary winding 104 and at least one secondary winding 106. In the input circuit 101, the primary winding 104 can be coupled to a power source 108 and a switch 110 for selectively providing current to the primary wiring 104. In general, during the time interval in which current is not being provided to the primary winding 104, a voltage is generated between a first terminal 107a and a second terminal 107b of the secondary winding 106 and a current can flow to a connected circuit. As one of ordinary skill in the art will recognize, the induced voltage is typically based on the configuration of the transformer. For example, in the case of the exemplary power converter 100 in FIG. 1, the primary and secondary windings 104, 106, can be configured to provide an increased or decreased voltage across the terminals 107a, 107b of the secondary winding 106 as compared to the voltage across the primary winding 104. The output circuit 113 can be part of a rectifier circuit 112 that can be coupled to the terminals 107a, 107b, and can be used to rectify the input time-varying signal caused by the opening and closing of switch 110. The output of the rectifier circuit 112 can be coupled to a load impedance $Z_o$ of the converter 100

In the various embodiments of the invention, a rectifier circuit can be formed using a synchronous MOS transistor rectifier. For example, as shown in FIG. 1, a synchronous PMOSFET 114 is used in rectifier circuit 112. The PMOSFET 114 includes a drain, source, and gate nodes or terminals which are respectively identified as D, S, and G in FIG. 1. Typically, a DC-DC converter with a synchronous MOS transistor rectifier operates by providing coordinated control signals to the input and output sides of the DC-DC converter. For example, in the circuit shown in FIG. 1, a control signal ($V_{switch}$) for a switch 110 coupling a power source 108 to the primary winding 104 and a control signal to a gate node (G) of the PMOSFET 114 would be carefully coordinated. The timing used for these control signals determines whether the power converter 100 operates in a continuous or discontinuous mode of operation.

As previously described, a DC-DC converter is typically operated in a discontinuous mode for many low power applications. Therefore, the timing between full discharge of the secondary winding 106 and the closing of the switch 110 is typically critical for discontinuous mode power converters. Typically, the timing between these elements would be controlled by alternating the opening and closing of a switch 110 and selectively controlling a voltage applied at a gate node (G) of the PMOSFET 114. Consequently, a series of voltage pulses from the power source 108 are applied to the primary winding 104. Typically, to maintain operation in a discontinuous mode, thorough characterization of transformer 102 and the load circuit Zo in power converter 100 would be required. In particular, the power converter 100 would be characterized to determine the expected amount of time needed to completely discharge the secondary winding 106 and determine the proper switching cycle for the power converter 100. A "switching cycle," as used herein refers to the time a switch 110 coupled to the primary winding 104 of the transformer 102 is kept in a closed position (the width of the voltage pulse at the primary winding 104) and in an open position (the period of time following the voltage pulse). Although a switching cycle can be controlled using a periodic control signal for $V_{switch}$, the control signal need not be periodic. Accordingly, the number, length, and frequency of the voltage pulses can vary in the various embodiments.

In DC-DC converter designs running in discontinuous mode, a switching cycle typically includes additional margin time to ensure that the secondary winding gets completely discharged (i.e., current is zero) prior to the end of the switching cycle. That is, the total length of the switching cycle is not only limited to the charging and discharging times of primary and secondary windings 104, 106 of the transformer 102, but can also include the additional margin time added prior to closing the switch 110. Unfortunately, the added margin time results in increased complexity in control of synchronous MOS transistor rectifiers. In discontinuous mode, there is typically always a finite additional margin time. Accordingly, commercially available synchronous boost converter control integrated circuits typically keep the synchronous MOS transistor rectifier "ON" for the entire time the secondary winding 106 of the transformer 102 is discharging plus during the additional margin time. This can be a problem, because during the additional margin time; if the MOS transistor rectifier is conducting, a circuit coupled to the output can source current back towards the secondary winding 106, increasing the inefficiency of the DC-DC converter. Therefore, ensuring that the MOS transistor rectifier only conducts during the time required for the secondary winding 106 to discharge typically requires external control circuitry, such as an integrated circuit, increasing the size and complexity of a DC-DC converter with synchronous rectification in the discontinuous mode. Therefore, in the various embodiments of the present invention, rather than providing such external circuits to control operation of a synchronous MOSFET rectifier, a self-driven synchronous rectifier circuit for a power converter is provided. In particular, the self-driven synchronous rectifier circuit can be configured to automatically conduct current in a manner similar to the natural conduction of a diode rectifier.

Figure 2:
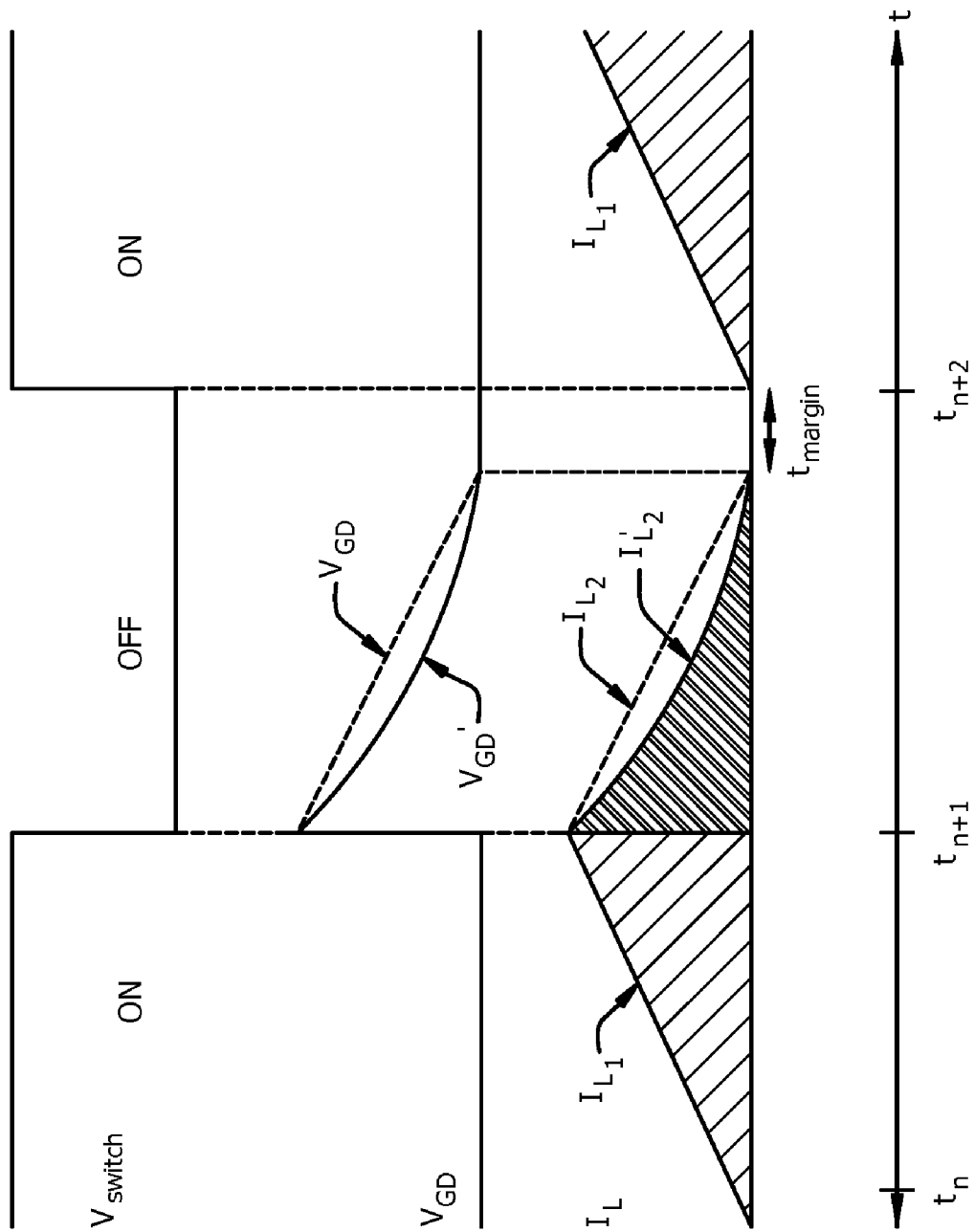
FIG. 2 is a waveform diagram for an exemplary flyback power converter having a self-driven synchronous rectifier according to an embodiment of the present invention.

Typically, operation of a DC-DC converter using a synchronous MOS transistor rectifier arrangement results in the current from the secondary winding varying over time, resulting in the typical "sawtooth" pattern seen for discontinuous mode power converters. For example, the currents $I_{L1}$, $I_{L2}$ in the primary and second windings 104, 106 of the transformer 102 would typically be linear in nature. That is, as shown in FIG. 2, over the time a control signal is applied to the switch 110 ($V_{switch}$ is in an "on" state), the power source 108 is coupled to the primary winding 104. During this time period ($t_n$ to $t_{n+1}$), $|I_{L1}|$ increases linearly as the power source 108 of the power converter 100 charges the primary winding 104. Once the control signal is no longer applied to the switch 110 ($V_{switch}$ is in an "off" state) at $t_{n+1}$, the switch 110 on the primary side of the transformer 102 is opened and no voltage is provided across the primary winding 104 and $|I_{L1}|$ drops to zero. However, a voltage can develop across the secondary winding 106 as the charge in the primary winding 104 is electromagnetically transferred to the secondary winding 106. If a current path is provided to the secondary winding 106 during this time ($t_{n+1}$ to $t_{n+2}$), the transferred charge is then typically discharged as a linearly falling current, shown as $|I^0_{L2}|$ in FIG. 2. Although a control signal can be applied to the switch 110 to coincide with the time $|I^0_{L2}|$ finally reaches zero, as previously described, an additional margin time $t_{margin}$, can be added to the end of the switching cycle to provide sufficient margin to ensure discontinuous mode operation of the power converter 100. One of ordinary skill in the art will recognize that the voltage and current curves illustrated in FIG. 2 have been simplified for explanatory purposes. Typically, such curves would include additional signals, including spikes, ringing, and other signals typically resulting from switching devices on and off in a circuit. Such signals will also be present in circuits embodying the various embodiments of the present invention but do not affect the operation of these circuits.

The inventor notes that for proper operation of the power converter 100 using a synchronous MOS transistor rectifier, a reduction in the output current is not required to vary linearly. Therefore, one aspect of the present invention provides for allowing a non-linearly reducing current $|I^1_{L2}|$, rather than linearly reduced current $I^0_{L2}$, through the secondary winding 106. In particular, a non-linear current can be provided that more closely approaches zero prior to added time $t_{margin}$. For example, in some embodiments of the present invention, the current can be reduced exponentially. Therefore, an exponentially reduced current $|I^1_{L2}|$ can allow the PMOSFET 114 rectifier to essentially be forced off prior to added time $t_{margin}$. Thus, the various embodiments of the invention provide an output circuit 113 including a MOSFET-based rectifier circuit 112 in which the current through the PMOSFET 114 is reduced non-linearly. In particular, the various embodiments of the present invention provide a control circuit 115 that adjusts a control voltage at the gate node (G) of a PMOSFET 114 non-linearly ($|V_{GS}^1|$), rather than linearly ($|V_{GS}^0|$). Accordingly, the current through the PMOSFET 114 is also reduced non-linearly. As a result, as shown in FIG. 2, prior to the added margin time, at $t=(t_{n+2})-t_{margin}$, the current $|I^0_{L2}|$ is already near or at zero. Therefore, the PMOSFET 114 rectifier is essentially turned off prior to the end of the switching cycle. Therefore, the present invention not only ensures a discontinuous mode of operation for the power converter 100, but also ensures that PMOSFET 114 does not allow the output voltage to source current back to secondary winding 106. Additionally, the present invention can allow $t_{margin}$ to be reduced or eliminated, reducing the length of the switching cycle. That is, any reverse current from the load $Z_o$ is blocked by the MOS transistor rectifier 114 being in an off state prior to the end of the switching cycle.

To provide an exponentially varying control voltage, the various embodiments of the present invention provide a control circuit 115 including a reactive network for adjusting the control voltage for the PMOSFET 114. In particular, the reactive network can provide a time-varying voltage at the gate node (G) of the PMOSFET 114 having a transient that is less than the time interval between the switch 110 alternating between an open and a closed state. A "transient" as used herein, refers to the time required for a reactive network to reach a final steady-state condition. For example, some embodiments of the present invention can include a resistor-capacitor (RC) network in which the time constant τ of the RC network can be used advantageously to provide the necessary transient for the control voltage of a MOSFET rectifier. In such embodiments, a transient can be proportional to the RC time constant. Although any multiple of τ can be used, typically at least a value of 5τ is generally recognized by one of ordinary skill in the art to result in a final steady-state condition for an RC circuit. However, the invention is not limited to only the use of purely RC circuits. In some embodiments of the present invention, any combination of resistors, capacitors, and inductor elements can be used to provide the necessary transient.

Referring back to FIG. 1, the control circuit 115 can be configured to include the necessary elements for forming such an RC network. As shown in FIG. 1, the RC network can include a first resistor $R_1$ coupled between the source node and the gate node of the PMOSFET 114. The RC network can also include an impedance network $Z_2$ coupled between the gate node of the PMOSFET 114 and a second terminal 107b or ground node for the power converter 100 via a switch device $S_2$. In such embodiments, the switch device $S_2$ can ensure that a current only flows through the RC network when a switch voltage is provided at the first terminal 107a. In particular, the control node for the switch device $S_2$ can be coupled to the first terminal 107a of the secondary winding 106. In some embodiments, a low gate charge NMOSFET device can be used to ensure that the typical range of voltages generated across the secondary winding 106 are sufficient to switch the NMOSFET device on. However, the invention is not limited to only MOSFET transistors, and the switch $S_2$ can also be implemented using a bipolar transistor or any other type of voltage-controlled switch or resistor. Furthermore, in some embodiments, a large bleed resistor $R_B$ can be used to limit or prevent a voltage drop between the first terminal and a control node of the switch device $S_2$ and ensure a sufficient voltage is provided at the control node of the switch device $S_2$. Although any size of bleed resistor can be used, the size can be based on the amount of power that can be dissipated without affecting converter performance. Therefore, the value can be limited to minimize power loss and increase efficiency. For example, 1 k to 100 k-ohm resistors can be used without significant power loss, depending on the amount of charge required to activate switch device $S_2$. That is, the lower the charge required for switch device $S_2$ is, the lower the value of the resistor $R_B$ can be.

An exemplary impedance network $Z_2$ can include one or more capacitor elements in parallel with one or more resistive elements. For example, in one embodiment of the present invention, $Z_2$ can comprise a capacitor $C_2$ in parallel with a resistor $R_2$. However the invention is not limited in this regard and any number or combination of resistors and capacitors can be used. In addition to the additional resistive and capacitive components included in the rectifier circuit 112, embodiments of the present invention advantageously utilize the source to gate parasitic capacitance Cp of the PMOSFET 114. However, the invention is not limited in this regard and in some embodiments of the present invention, a capacitor can also be connected between the source and gate of the PMOSFET 114, albeit with an increase in τ, resulting in slower performance. Together, the parasitic capacitance Cp, resistor $R_1$, and the impedance network $Z_2$ provide an RC network capable of adjusting the control voltage at the gate of the PMOSFET 114 exponentially. The operation of rectifier circuit 114 will be discussed below for an exemplary impedance network $Z_2$ comprising a resistor R2 and a capacitor $C_2$ in parallel.

In such embodiments of the present invention, the values for the resistors $R_1$, $R_2$ and the capacitor $C_2$ can be selected to provide parallel capacitor-based and resistor-based voltage dividers that allow the voltage between the source and gate nodes of the PMOSFET 114 to evolve exponentially over time to turn off the PMOSFET 114. For example, the value of capacitor $C_2$ can be selected to be greater than the capacitor value of the parasitic capacitance Cp of the PMOSFET 114 between the source and gate nodes. Similarly, the values of resistors $R_1$, $R_2$ are selected such that the resistor value of resistor $R_2$ is greater than that of resistor $R_1$. For example, in one embodiment for a discrete PMOSFET device is provided for PMOSFET 114. In particular, a SI5401DC discrete PMOSFET, manufactured by Vishay, can be coupled to a discrete capacitor $C_2$ having a value of 8 nF and discrete resistors $R_1$ and $R_2$ having values of 15 ohms and 300 ohms, respectively. However, the invention is not limited to only discrete components and the rectifier circuit 112 can also be formed, at least in part, in an integrated circuit. These values are provided for exemplary purposes only. In the various embodiments of the present invention, a ratio between resistors $R_1$ and $R_2$ can vary from 1:10 to 1:20. For example, $R_1$ can have a value between 10 and 50 ohms and $R_2$ can have a value between 100 and 500 ohms. Similarly, in the various embodiments of the present invention, a ratio between $C_2$ and the parasitic capacitance Cp of the PMOSFET 114 being used can vary from 10:1 to 30:1.

Consequently, the result is an RC network that provides parallel capacitor-based voltage divider and resistor based voltage dividers. In operation, the source to gate voltage is initially dominated by the capacitor-based voltage divider and later dominated by the resistor-based voltage divider. As a result, a time-varying non-linear voltage is provided at the gate node (G) of the PMOSFET 114. The time-varying nonlinear voltage provides initially a higher source to gate voltage for the PMOSFET 114 which exponentially decays as the source to gate voltage is increasingly controlled by the resistor-based voltage divider.

As previously discussed, the switching cycle begins with the switch 110 coupled to the primary winding 104 being closed for a time period and subsequently opened, as previously discussed. At this point in time, when voltage is no longer applied across the primary winding 104, the stored energy in the transformer 102 results in a voltage being developed across the terminals 107a, 107b of the secondary winding 106. In response to this developed voltage, the switch $S_2$ can close, connecting the control circuit 115 to the second terminal 107b or a ground node for the secondary winding. Furthermore, a leakage current through a drain-source path of the PMOSFET 114 can also develop as the secondary winding 106 begins to generate a current.

Figure 3A:
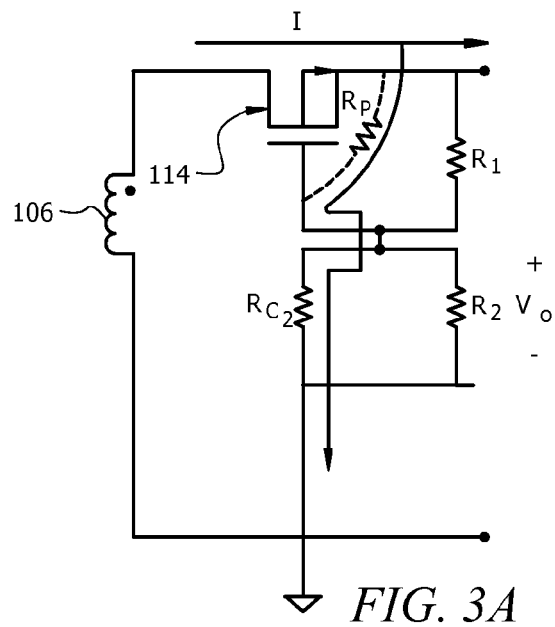
FIG. 3A is a schematic diagram of a self-driven synchronous rectifier of FIG. 1 during a first operational stage of the rectifier circuit.

Once at least a small current is flowing through the drain-source path of the PMOSFET rectifier and the switch $S_2$ is closed, the RC circuit can operate over four stages. The stages can result in an exponentially varying control voltage at the gate node of the PMOSFET 114. The exponentially varying control voltage can result in an exponentially varying source to gate voltage and drain current. In the first stage, as shown in FIG. 3A, the leakage current can not only flow to an output of the power converter 100, but can also begin to charge parasitic capacitance Cp and capacitor $C_2$. In FIGS. 3A-3D, switch $S_2$ is not shown, as it operates as a short to ground. During this initial charging, parasitic capacitance Cp and capacitor $C_2$ also acts as small resistances, Rp and $R_{C2}$. Therefore, no or little current flows through resistors $R_1$ and $R_2$ and the constant output voltage $V_o$ developed across the secondary winding 106, is divided between resistors $R_P$ and $R_{C2}$. As stated above, parasitic capacitance Cp is less than capacitance $C_2$, therefore $R_{C2}$ provides a smaller resistance as compared to resistor Rp, therefore a majority of the voltage at the source node of the PMOSFET 114 is dropped across resistor Rp. This can result in a source to gate voltage of the PMOSFET 114 being developed, turning PMOSFET 114 fully on and resulting in the peak current shown in FIG. 2 by $|I^o{}_{L2}|$ at $t=t_{n+1}$.

After the PMOSFET 114 is fully turned on, the capacitor $C_2$ and the parasitic capacitance Cp continue charging. During the initial charging stage as shown in FIG. 3A, the resistance values for $R_{C2}$ and Rp still remain much lower than resistance values for resistors $R_1$ and $R_2$. Furthermore, the capacitor $C_2$ can continue to provide an exponentially varying resistance $R_{C2}$ and parasitic capacitance Cp can similarly continue to provide an exponentially varying resistance Rp. Consequently, a larger voltage drop continues to develop across the parasitic capacitance Cp. This varying voltage divider between Rp and $R_{C2}$ can continue to dominate the voltage for the gate node of the PMOSFET 114 until resistor values for Rp begins to approach the magnitude of the values of $R_1$.

Figure 3B:
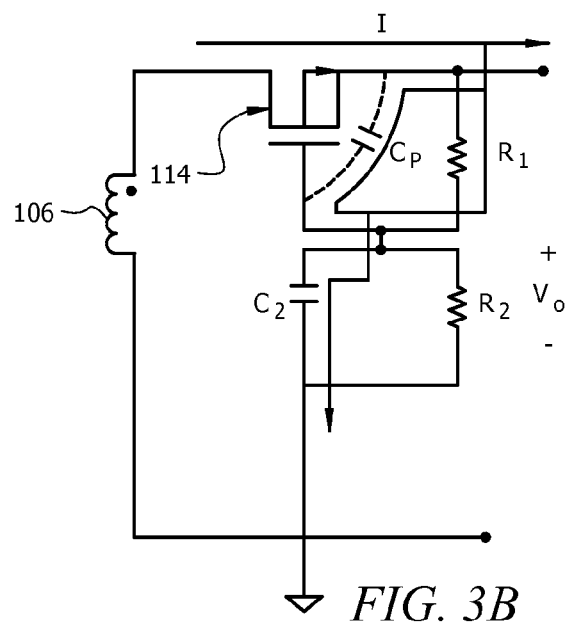
FIG. 3B is a schematic diagram of a self-driven synchronous rectifier of FIG. 1 during a second operational stage of the rectifier circuit.
Figure 3C:
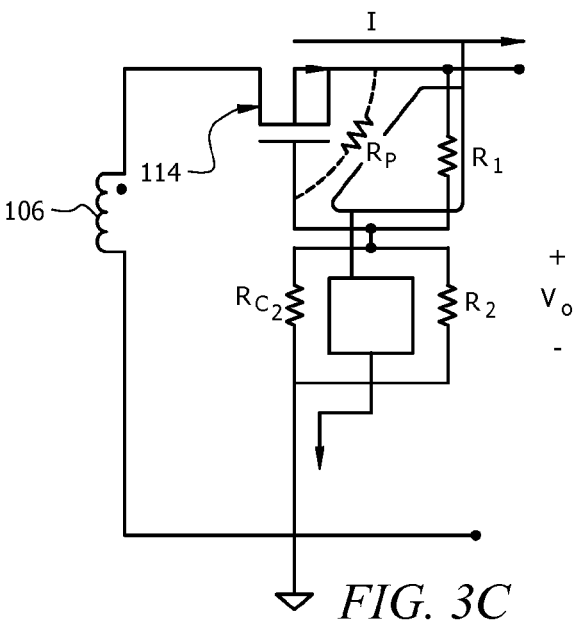
FIG. 3C is a schematic diagram of a self-driven synchronous rectifier of FIG. 1 during a third operational stage of the rectifier circuit.

During this second stage of operation, capacitor Cp is closer to being completely charged. In this stage of operation, the current flows not just through the resistors Rp and $R_{C2}$, but also begins to flow through resistor R1, as shown in FIG. 3B. Similarly, at some later point in time, capacitor C2 also starts coming closer to being completely charged. In this third stage of operation, the resistance value of $R_{C2}$ begins to approach and surpass the magnitude of resistor $R_2$. Therefore, at this point current can also begin to flow through $R_2$, as shown in FIG. 3C. In these second and thirds stages of operation, as the parasitic capacitance Cp and the capacitor $C_2$ continue to charge, the magnitudes of Rp and $R_{C2}$ further exponentially increase. Consequently, the voltage across the source and gate nodes of the PMOSFET 114 is increasingly dependent on the voltage divider based on resistors $R_1$ and $R_2$. However, even though the voltage divider is increasingly dependent on resistors $R_1$ and $R_2$, the exponentially varying values of $R_p$ and $R_{C2}$ still can result in the capacitor-based voltage divider continuing to vary the control voltage exponentially at the gate node of the PMOSFET 114.

Figure 3D:
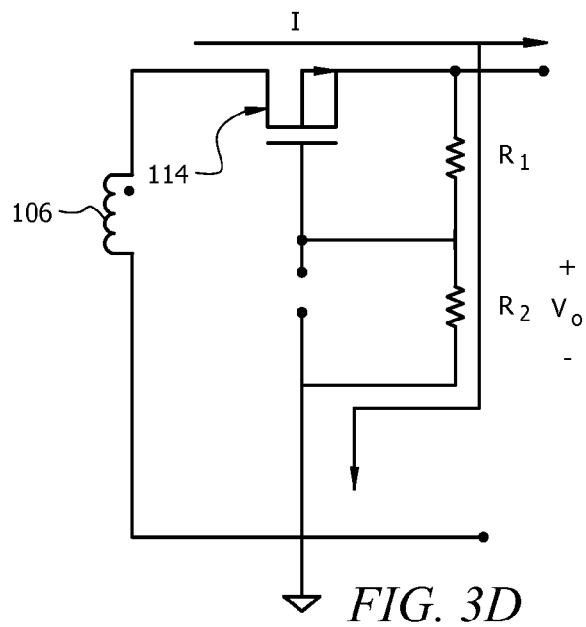
FIG. 3D is a schematic diagram of a self-driven synchronous rectifier of FIG. 1 during a fourth operational stage of the rectifier circuit.

In the last stage, as shown in FIG. 3D, the capacitors Cp, $C_2$ can be considered as being fully charged. Therefore, the capacitors Cp, $C_2$ can be considered to have infinite resistances or be considered "open". Therefore, at this point, the voltage between the source and gate nodes of the PMOSFET 114 can be completely dominated by the voltage divider of resistors $R_1$ and $R_2$. Although any resistor values for resistors $R_1$ and $R_2$ can be used, by configuring resistor $R_1$ to be significantly less than resistor $R_2$, the voltage divider can result in a majority of the voltage dropping across resistor $R_2$. By minimizing the voltage across the source and gate nodes of the PMOSFET 114, the PMOSFET 114 is effectively turned off. Although FIGS. 3A-3D illustrate that at some point current is flowing through $R_1$, $R_2$, Cp, and $C_2$, the invention is not limited in this regard. In some embodiments of the present invention, Cp can become completely charged prior to current flowing through $R_2$ or prior to $C_2$ becoming completely charged. In such embodiments the resulting voltage divider can then be based on $R_1$ and $R_{C2}$ or $R_1$ and a parallel combination of $R_{C2}$ and $R_2$.

Referring back to FIG. 1, once the PMOSFET 114 is turned off (i.e., blocks current), the current $I_{L2}$ at the secondary winding 106 is essentially forced to zero, resulting in a discontinuous mode of operation. The switching cycle can then begin anew once switch 110 is closed again to charge the primary winding 104. In the various embodiments, because the PMOSFET 114 is essentially off prior to the end of the switching cycle, the switching cycle can be configured with a reduced or even eliminated margin time. Once the switching cycle begins again, any remaining charge in the rectifier circuit 112 (such as in capacitor $C_2$ or the parasitic capacitance Cp) can be discharged along with charge stored in impedance load $Z_o$ to the output. Therefore, these charges cannot generate a reverse current in the secondary winding 106.

Although the present invention has been discussed in terms of the exemplary embodiment of a flyback power converter, the invention is not limited in this regard. The present invention is equally applicable to other types of converters operating in continuous mode or discontinuous mode and requiring synchronous rectification, including, but not limited to boost, buck-boost, and SEPIC converters. Also, although the present invention has been described and illustrated in terms of operation of a PMOSFET-based rectifier, the invention is not limited in this regard and a rectifier circuit for a power converter can be configured using a NMOSFET-based rectifier. In such embodiments, the circuit can be similarly configured, with the exception that the NMOSFET-based rectifier be re-located in the return path of the converter's output side. That is, instead of coupling the NMOSFET to the first terminal 107A of the secondary winding 106, as shown for the PMOSFET 114 in FIG. 1, the NMOSFET-rectifier would be coupled to the second terminal 107B of the secondary winding 106.

Additionally, as shown in FIG. 1, other elements can be added to the rectifier circuit 112 to enhance or improve its operation. For example, in some embodiments, a bypass diode $D_{bypass}$ can be coupled in parallel with the PMOSFET 114. In these embodiments, the bypass diode $D_{bypass}$ can enhance initial operation of the rectifier circuit 114, by ensuring that at least some current initially flows through resistor $R_1$. Thus, the bypass diode $D_{bypass}$ can be useful when the leakage current of the PMOSFET 114 is insufficient to begin charging the capacitor $C_2$ in the rectifier circuit 112. Although any type of diode can be used, a Schottky diode can be used in embodiments where a smaller forward voltage drop is desired.

In another example, a small signal diode $D_{SS}$ can be inserted in series with resistor $R_1$, as shown in FIG. 1. In the various embodiments of the present invention, a linear function for $I_{L2}^0$ can be more closely approximated by increasing the value of resistance for $R_1$ with respect to $R_2$. However, the increased value of $R_1$ results in a larger voltage drop across the source and gate nodes of the PMOSFET 114. Unfortunately, if the value of $R_1$ is too high, the PMOSFET 114 will not turn off as quickly and allow current to be conducted back to the secondary winding, reducing the efficiency of the converter 100. Therefore, rather than increasing the resistance of $R_1$, a diode $D_{SS}$ can be used to increase the voltage across the source and gate of the PMOSFET 114. That is, as current begins to flow through $R_1$, a forward voltage is developed across $D_{SS}$, resulting in an additional voltage drop. The additional voltage drop results in increased conductivity of the PMOSFET 114, increasing $I_{L2}^0$ to more closely approximate a linear function, increased switching speed, and an overall improvement in the efficiency of the DC-DC converter 100.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. A self-driven synchronous DC-DC converter circuit, comprising:
    an input circuit comprising a switching device configured for selectively generating a pulsed DC input voltage responsive to an input switch control signal, said pulsed DC input voltage comprising a plurality of DC voltage pulses;
    an output circuit coupled to said input circuit, said output circuit comprising an active device having a device input node, a device output node, and a device control node, said device control node responsive to a control voltage for selectively varying a conductivity between said device input node and said device output node; and
    a control circuit coupled to said device control node and configured for generating said control voltage responsive to said pulsed DC input voltage;
    wherein said control voltage is synchronized with said pulsed DC input voltage, and varies non-linearly during an interval between said DC voltage pulses for selectively reducing said conductivity in accordance with a non-linear function following each of said voltage pulses.

2. The converter circuit of claim 1, wherein said control voltage varies exponentially during said interval.

3. The converter circuit of claim 1, wherein said control circuit is a reactive network.

4. The converter circuit of claim 1, said active device further having at least one capacitive element between said device control node and said device output node, and wherein said control circuit comprises a resistor-capacitor network.

5. The converter circuit of claim 4, wherein said active device is a MOS transistor.

6. The converter circuit of claim 4, said control circuit further comprising:
    a switch having a switch control node and first and second switch nodes, said switch control node coupled to said device input node, and said first node coupled to a reference voltage, said switch device switching between a current blocking state and a current conducting state between said first and said second switch nodes responsive to said pulsed DC input voltage.

7. The converter circuit of claim 6, wherein said resistor-capacitor network is comprised of:
    a first resistor coupled from said device output node to said device control node, and
    an impedance network coupled to from said device control node to said second switch node, said impedance network comprising one or more capacitive elements and one or more second resistor elements.

8. The converter circuit of claim 7, wherein said second resistor elements are connected in parallel with said capacitor elements.

9. The converter circuit of claim 8, wherein a capacitance of said capacitor elements is greater than a capacitance of said capacitive element in said active device.

10. The converter circuit of claim 8, wherein a resistance of said second resistor elements is greater than a resistance of said first resistor.

11. A method for converting a first DC voltage to a second DC voltage, comprising:
    generating a pulsed DC input voltage responsive to an input switch control signal, said pulsed DC input voltage comprising a plurality of DC voltage pulses;
    generating a control voltage at a device control node of an active device responsive to said pulsed DC input voltage;
    selectively varying a conductivity between a device input node and a device output node of said active device in response to said control voltage; and
    synchronizing said control voltage with said pulsed DC input voltage, and varying said control voltage non-linearly during an interval between said DC voltage pulses for selectively reducing said conductivity in accordance with a non-linear function following each of said voltage pulses.

12. The method of claim 11, wherein varying step further comprises varying said control voltage exponentially during said interval.

13. The method of claim 11, wherein said generating step further comprises generating said control voltage using a reactive network.

14. The method of claim 11, further comprising providing an active device having at least one capacitive element between said device control node and said device output node, and wherein said generating step further comprises generating said control voltage by using said capacitive element and a control circuit comprising a resistor-capacitor network.

15. The method of claim 14, further comprising selecting a MOS transistor for said active device.

16. The method of claim 14, further comprising selecting a switch for said control circuit, said switch having a switch control node and first and second switch nodes, said switch control node coupled to said device input node, and said first node coupled to a reference voltage, said switch device switching between a current blocking state and a current conducting state between said first and said second switch nodes responsive to said pulsed DC input voltage.

17. The method of claim 16, further comprising selecting for said resistor-capacitor network a first resistor coupled from said device output node to said device control node, and an impedance network coupled to from said device control node to said second switch node, said impedance network comprising one or more capacitive elements and one or more second resistor elements.

18. The method of claim 17, further comprising arranging said second resistor elements and said capacitor elements in parallel.

19. The method of claim 18, further comprising selecting said capacitor elements to have a capacitance greater than a capacitance of said capacitive element in said active device.

20. The method of claim 18, further comprising selecting said second resistor elements to have a resistance greater than a resistance of said first resistor.

* * * * *